No. 839,985. PATENTED JAN. 1, 1907.
W. H. BRISTOL.
THERMO ELECTRIC GENERATOR.
APPLICATION FILED DEC. 26, 1905.

2 SHEETS—SHEET 1.

Witnesses

William H. Bristol, Inventor
By His Attorney

No. 839,985. PATENTED JAN. 1, 1907.
W. H. BRISTOL.
THERMO ELECTRIC GENERATOR.
APPLICATION FILED DEC. 26, 1905.

2 SHEETS—SHEET 2.

Witnesses
Sally O. Yudisky
G. Wm. Eisenbaum

William H. Bristol Inventor
By his Attorney Fredk A. Schuetz

UNITED STATES PATENT OFFICE.

WILLIAM H. BRISTOL, OF NEW YORK, N. Y.

THERMO-ELECTRIC GENERATOR.

No. 839,985.

Specification of Letters Patent.

Patented Jan. 1, 1907.

Application filed December 26, 1905. Serial No. 293,251.

*To all whom it may concern:*

Be it known that I, WILLIAM H. BRISTOL, a citizen of the United States, and a resident of New York, in the county of New York and State of New York, have invented certain new and useful Improvements in Thermo-Electric Generators, of which the following is a specification.

My invention relates to thermo-electric generators, and particularly to thermo-electric generators as applied to the measurement of temperature, as in thermo-electric pyrometers; and it has for its object to provide a thermo-electric generator which though composed of several couples of differing elements and in series still acts as a single couple.

For this purpose my invention consists, essentially, of a thermo-electric generator comprising a primary couple or series of primary couples and one or more supplementary couples arranged in series therewith and having the hot end or ends located in close proximity to the cold end of said primary couple or series of primary couples, whereby both the cold end of the primary couple or couples and the hot end or ends of the supplementary couple or couples are exposed to the same temperature, and any fluctuations of temperature at these points are caused to produce equivalent and opposite effects in the respective couples, and the electromotive force produced by the generator as a whole is at all times dependent only upon the difference of temperature between the hot end or ends of the primary couple or couples and the cold end of the supplementary couple or couples, temperature variations at intermediate points having no effect on the generator as a whole.

The nature of my invention will be best understood in connection with the accompanying drawings, in which—

Figure 1:
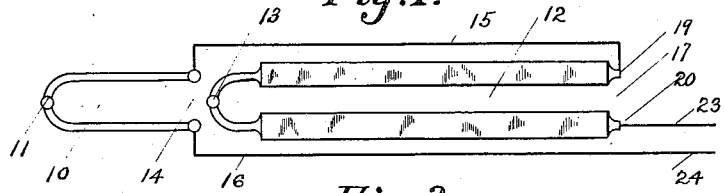
Figure 2:
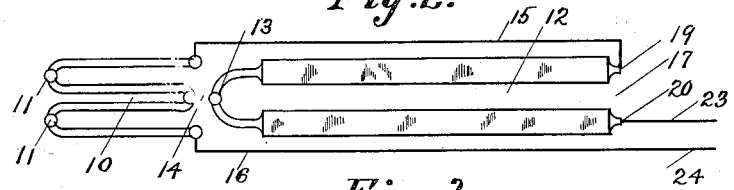

Figure 1 is a plan view of my thermo-electric generator. Fig. 2 is a similar view showing a number of primary couples in series and one supplementary couple. Figs. 3 to 9 are plan views showing modifications.

Similar characters of reference designate corresponding parts throughout the several views.

Referring now to the drawings, my improved generator in the form shown in Fig. 1 comprises a thermo-electric couple 10, the juncture of whose elements is designated by the numeral 11 and which is the hot end of the said couple, and a supplementary couple 12 with the juncture and hot end 13. For extremely high temperatures I make the elements of the primary couple of metals or alloys capable of withstanding such temperatures—for example, platinum as one element and an alloy of platinum with ten per cent. rhodium as the other element. Such metals being very expensive, I make this primary couple just long enough to have its outer or cold end 14 away from the extreme heat and complete the generator by means of the supplementary couple 12, connected in series with said primary couple 10 by means of the conductors 15 and 16 of metals or alloys capable of withstanding the semi-extreme temperatures. This supplementary couple not being exposed to extremely high temperatures may be made of elements of cheaper metals having lower fusing-points—such as German silver with different percentages of nickel, nickel alloys, iron, &c.—and which metals, because of their cheapness, may be made of large cross-section, producing a couple of low resistance.

Figure 3:
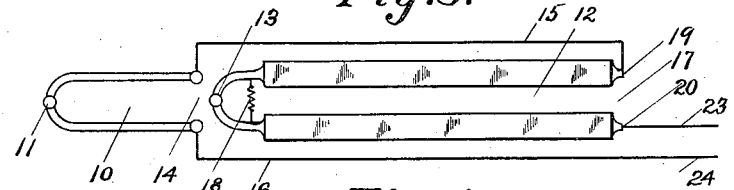
Figure 4:
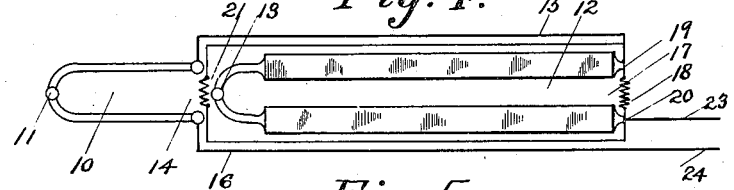

The primary couple and the supplementary couple are so arranged with respect to each other that their respective electromotive forces add, and by further arranging the hot end 13 of the couple 12 in close proximity to the cold end 14 of the couple 10 temperature variations upon the cold end 14 of the said couple 10 are made to produce equivalent opposite thermo-electric effects in the couple 12. A balance is thus maintained, and the thermo-electric effect of the generator as a whole is the same as though these points 13 and 14 did not exist, but the generator were exposed only to the temperatures at its hot end 11 and cold end 17. For example, the electromotive force of the primary couple 10 is dependent upon the difference of temperature between its hot end 11 and its cold end 14 and the electromotive force of the couple 12 upon the difference of temperature between its hot end 13 and its cold end 17. As the cold end 14 of the couple 10 is at the same temperature as the hot end 13 of the couple 12, any variations of temperature at this point will not affect the generator as a whole so long as unit differences of temperature between the ends of either couple produce equivalent opposite thermo-electric effects in each couple. It is often difficult, however, to select the proper elements to perfectly accomplish this result. I prefer, therefore, to approximate this condition, using a supplementary couple which produces a somewhat higher electromotive force for unit differences of temperature than the primary couple, and then secure the balance by inserting across the supplementary couple a shunt 18 of suitable resistance, as shown in Figs. 3 and 4. For example, assume a temperature at the hot end 11 of 1000° Fahrenheit, and at the two ends 13 and 14 of 800° Fahrenheit. A deflection of two hundred divisions will be produced by the couple 10, due to the difference of 200° Fahrenheit between its ends, and a deflection of eight hundred divisions by the couple 12, due to the difference of 800° Fahrenheit. A total deflection of one thousand divisions is thus produced upon the indicating instrument, since the two couples are in series. Now let it be assumed that the temperature at the ends 13 and 14 drops to 700° Fahrenheit. A deflection of three hundred divisions would be produced by the couple 10, owing to the increased difference of temperature, and a deflection of seven hundred divisions by the couple 12, owing to the decreased difference of temperature, the total deflection, however, still being one thousand divisions, as before, and remains constant irrespective of the change which has occurred at the points 13 and 14. Now let the initial conditions be again assumed, but the difference of 800° between the ends 13 and 17 of the couple 12 produce a deflection of sixteen hundred divisions instead of eight hundred, making a total deflection of eighteen hundred divisions. Assume the temperature at the ends 13 and 14 to again drop to 700°. The couple 10 will then produce a deflection of three hundred divisions, as before, but the couple 12 will produce a deflection of fourteen hundred divisions, making a total deflection of seventeen hundred divisions, due to the same difference of temperature of 1000°. It will thus be seen that the two indications do not correspond, notwithstanding the fact that no change of temperature has occurred at either the hot end 11 or the cold end 17 of the thermo-electric generator. This error is due to the fact that unit differences of temperature between the hot and cold ends of each couple do not produce equivalent thermo-electric effects in the two couples, and therefore temperature variations at the ends 13 and 14 will affect the generator as a whole. To overcome this difficulty, I employ the aforesaid shunt, which short-circuits a part of thermo-electric effect of the couple 12, cutting it down to make unit differences of temperature between its ends produce thermo-electric effects equivalent to those produced by unit differences of temperature between the ends of the couple 10. The total effect of the generator is therefore independent of changes of temperature at points intermediate of its hot end 11 and its cold end 17 and depends only upon variations of temperature at either of these points. The location of the shunt 18 with respect to the couple 12 is immaterial, and I may place it across the terminals 19 and 20 of said couple at intermediate points or at the hot end 13, as shown in Fig. 3. In this latter position the shunt serves an additional purpose—viz., to overcome the effects due to temperature variations at the junctions of the elements of the primary couple 10 with the conductors 15 and 16. As these conductors 15 and 16 are of necessity of metals or alloys different from the elements of the couple 10, their junctions with said elements will form secondary couples producing thermo-electric effects which must be made to neutralize each other, as disclosed in my prior patent, No. 764,177, of July 5, 1904, or must be compensated for, as disclosed in my copending application, Serial No. 290,017, filed December 2, 1905. The combined results of these secondary effects is made to oppose the total effect of the generator comprising the primary and supplementary couples and to increase with increase of temperature. If, therefore, the resistance-shunt 18 has a positive resistance coefficient, it will likewise increase with increase of temperature, short-circuiting less of the effect of the couple 12, and thereby compensating for the said secondary effects, as more fully set forth in the aforesaid copending application.

Figure 5:
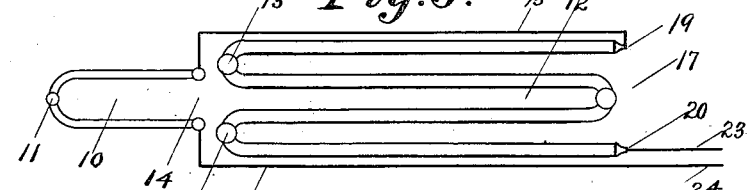

Instead of making the resistance in one piece, as shown in Fig. 3, I may subdivide it, as shown in Fig. 4, the portion 18 serving to correct for the overeffect of the couple 12 and is connected across the terminals 19 and 20 of said couple. The other portion 21 is likewise connected across the terminals 19 and 20; but its active portion 21 is placed in close proximity to the cold end 14 and serves to compensate for the secondary effects at the junctions between the elements of the couple 10 and the conductors 15 and 16.

Where I have occasion to make the primary couple of elements which give a greater electromotive force than the supplementary couple would if comprising but one couple, I place several of these supplementary couples 12 in series, as illustrated in Fig. 5, so as to obtain thermo-electric effects equal to or greater than (per unit difference of temperature) that of said primary couple 10. For example, should the primary couple be composed of the elements antimony and bismuth they would give a much greater thermo-electric effect per unit difference of temperature than a supplementary couple composed of iron and nickel-alloy elements. I would therefore be obliged to place several of these supplementary couples in series to obtain an equal or greater thermo-electric effect. There would be no object in having the supplementary couple to give a less effect than the primary couple and then cut down the effect of the latter to correspond, as it is one of the objects of the present invention to obtain the desirable and maximum effective properties of the primary couple while retaining but a minimum length of such couple. As the primary couples are of expensive material or materials which are not practicable to make of the length required and of the desired cross-section for a complete thermo-electric generator and as these materials are also usually of high resistance, it is important to make them as short as possible and complete the generator by means of the less expensive and more substantial materials, which because of their inexpensiveness may be made of considerable cross-section to reduce the resistance.

Figure 6:
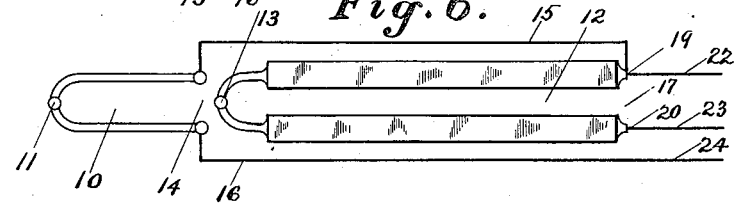
Figure 7:
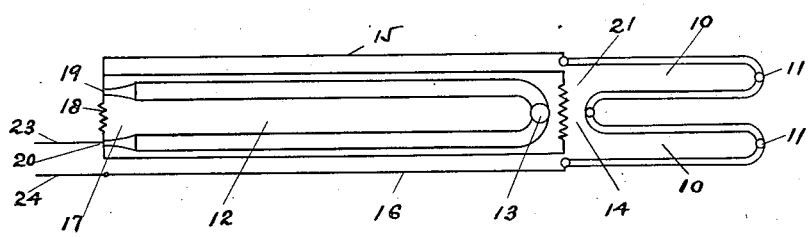
Figure 8:
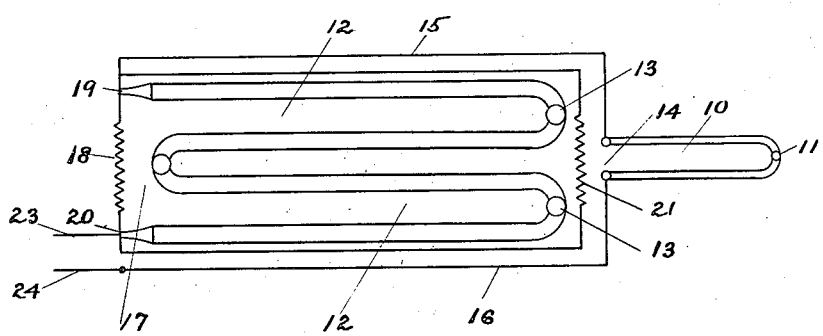
Figure 9:
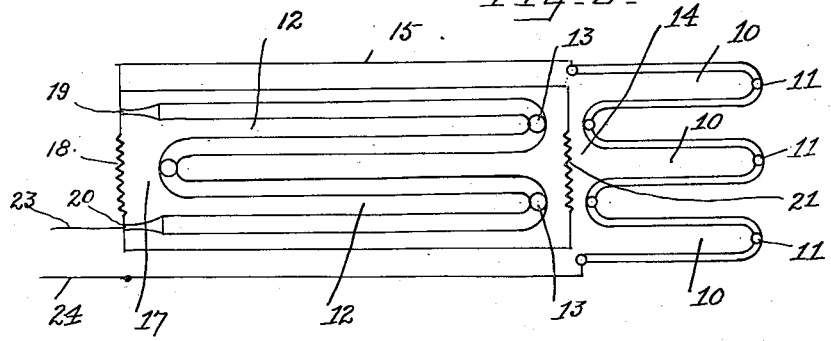

Another advantage of the arrangement of the couple as herein disclosed is that I am enabled to use the same generator for the measurement of the temperature at different points along said generator—that is, if I take a conductor 22 from the terminal 19 in addition to the two leads 23 and 24, Fig. 6, I may by proper switching arrangement throw either the couple 12 or the couples 10 and 12 on one and the same indicating instrument, and thereby successively obtain the temperature at the hot end 11 or the hot end 13. I may of course also place more than two couples in series and do not wish to restrict myself to any number of couples so arranged, as my invention consists, essentially, in so arranging these couples with respect to each other that their electromotive forces may be added and produce the same effect as one single couple.

What I claim as new, and desire to secure by Letters Patent of the United States, is—

1. A thermo-electric generator comprising: a primary couple and a supplementary couple separate and distinct from said primary couple and in series therewith, the hot end of one couple being located in close proximity to the cold end of the other.

2. A thermo-electric generator comprising: a primary couple having elements of high fusing-points; a supplementary couple separate and distinct from said primary couple having elements of lower fusing-points than said primary couple, said supplementary couple being in series therewith and having its hot end located in close proximity to the cold end of said primary couple.

3. A thermo-electric generator comprising: a primary couple of platinum and platinum with ten per cent. rhodium, as elements; and a supplementary couple separate and distinct from said primary couple and in series therewith having elements of iron and nickel alloy, and having its hot end located in close proximity to the cold end of said primary couple.

4. A thermo-electric generator comprising: a series of primary couples; a supplementary couple in series therewith, separate and distinct from said series of primary couples and having its hot end located in close proximity to the cold end of said series of primary couples.

5. A thermo-electric generator comprising: a primary couple; and a number of supplementary couples in series therewith, said series of supplementary couples being separate and distinct from said primary couple and having its hot end located in close proximity to the cold ends of said primary couple.

6. A thermo-electric generator comprising: a primary couple and a supplementary couple separate and distinct from said primary couple and in series therewith, the hot end of one couple being located in close proximity to the cold end of the other; and means in connection with one of said couples to compensate for the overbalancing effect of the other.

7. A thermo-electric generator comprising: a primary couple; a supplementary couple in series therewith and of different elements from said primary couple, the hot end of one couple being located in close proximity to the cold end of the other; and a resistance-shunt across one of said couples.

8. A thermo-electric generator comprising: a primary couple; a supplementary couple in series therewith of different elements from said primary couple and having its hot end located in close proximity to the cold end of said primary couple; and a resistance-shunt across said supplementary couple.

9. A thermo-electric generator comprising: a primary couple having elements of high fusing-points; a supplementary couple having elements of lower fusing-points than said primary couple, and in series therewith and having its hot end located in close proximity to the cold end of said primary couple; and a resistance-shunt across said supplementary couple.

10. A thermo-electric generator comprising: a primary couple of platinum and platinum with ten per cent. rhodium as elements; a supplementary couple in series therewith of iron and nickel alloy as elements, and having its hot end located in close proximity to the cold end of said primary couple; and a resistance-shunt across said supplementary couple.

11. A thermo-electric generator comprising: a series of primary couples; a supplementary couple in series therewith of different elements from said primary couples and having its hot end located in close proximity to the cold end of said series of primary couples; and a resistance-shunt across said supplementary couple.

12. A thermo-electric generator comprising: a primary couple; a number of supplementary couples in series therewith and composed of elements different from those of said primary couple, said series having its hot ends located in close proximity to the cold end of said primary couple; and a resistance-shunt across said series of supplementary couples.

13. A thermo-electric generator comprising: a primary couple; a supplementary couple in series therewith of different elements from said primary couple, having its hot end located in close proximity to the cold end of said primary couple; and a resistance-shunt across said supplementary couple located in close proximity to the cold end of said primary couple.

14. A thermo-electric generator comprising: a primary couple having elements of high fusing-points; a supplementary couple having elements of lower fusing-points than said primary couple and in series therewith, and having its hot end located in close proximity to the cold end of said primary couple; and a resistance-shunt across said supplementary couple located in close proximity to the cold end of said primary couple.

15. A thermo-electric generator comprising: a primary couple of platinum and platinum with ten per cent. rhodium as elements; a second couple in series therewith of iron and nickel alloy as elements, and having its hot end located in close proximity to the cold end of said primary couple; and a resistance-shunt across said supplementary couple having a portion thereof located in close proximity to the cold end of said primary couple.

16. A thermo-electric generator comprising: a series of primary couples; a supplementary couple in series therewith of different elements from said primary couples and having its hot end located in close proximity to the cold end of said series of primary couples; and a resistance-shunt across said supplementary couple located in close proximity to the cold end of said series of primary couples.

17. A thermo-electric generator comprising: a primary couple; a number of supplementary couples in series therewith composed of elements different from those of said primary couple, said series having its hot ends located in close proximity to the cold end of said primary couple; and a resistance-shunt across said series of supplementary couples located in close proximity to the cold end of said primary couple.

18. A thermo-electric generator comprising: a primary couple; a supplementary couple in series therewith of different elements from said primary couple and having its hot end located in close proximity to the cold end of said primary couple; a resistance-shunt across said supplementary couple; and a second resistance-shunt across said supplementary couple, having a portion thereof located in close proximity to the cold end of said primary couple.

19. A thermo-electric generator comprising: a primary couple having elements of high fusing-points; a supplementary couple having elements of lower fusing-points than said primary couple and in series therewith, and having its hot end located in close proximity to the cold end of said primary couple; a resistance-shunt across said supplementary couple, and a second resistance-shunt across said supplementary couple, having a portion thereof located in close proximity to the cold end of said primary couple.

20. A thermo-electric generator comprising: a primary couple of platinum and platinum with ten per cent. rhodium as elements; a supplementary couple in series therewith of iron and nickel alloy as elements and having its hot end located in close proximity to the cold end of said primary couple; a shunt of suitable resistance across said supplementary couple, and a second resistance-shunt across said supplementary couple having a portion thereof located in close proximity to the cold end of said primary couple.

21. A thermo-electric generator comprising: a series of primary couples; a supplementary couple in series therewith of different elements from said primary couples and having its hot end located in close proximity to the cold end of said series of primary couples; a resistance-shunt across said supplementary couple; and a second resistance-shunt across said supplementary couple having a portion thereof located in close proximity to the cold end of said primary couple.

22. A thermo-electric generator comprising: a primary couple; a number of supplementary couples in series therewith, composed of elements different from those of said primary couple, said series having its hot ends located in close proximity to the cold end of said primary couple; a resistance-shunt across said series of supplementary couples; and a second resistance-shunt across said series of supplementary couples having a portion thereof located in close proximity to the cold end of said primary couple.

Signed at Manhattan borough, New York, in the county of New York and State of New York, this 21st day of December, A. D. 1905.

WILLIAM H. BRISTOL.

Witnesses:
   FREDK. F. SCHUETZ,
   S. O. YUDIZKY.